United States Patent [19]

McLandrich

[11] Patent Number: 4,763,272

[45] Date of Patent: Aug. 9, 1988

[54] AUTOMATED AND COMPUTER CONTROLLED PRECISION METHOD OF FUSED ELONGATED OPTICAL FIBER COUPLER FABRICATION

[75] Inventor: Matthew N. McLandrich, San Diego, Calif.

[73] Assignee: The United States of America as represented by the Secretary of the Navy, Washington, D.C.

[21] Appl. No.: 62,741

[22] Filed: Mar. 29, 1987

[51] Int. Cl.[4] ......................... G06F 15/46; G02B 6/38
[52] U.S. Cl. ...................................... 364/468; 65/4.2; 350/96.15; 350/96.21
[58] Field of Search ............... 364/468, 400, 525, 130, 364/167–171; 65/3.11, 4.2, 4.21; 350/96.15, 96.16, 96.21, 320; 156/158; 264/1.5

[56] References Cited

U.S. PATENT DOCUMENTS

| | | | |
|---|---|---|---|
| 4,054,366 | 10/1977 | Barnoski et al. | 350/96.15 |
| 4,291,940 | 9/1981 | Kawasaki et al. | 350/96.15 |
| 4,377,403 | 3/1983 | McLandrich | 65/3.11 |
| 4,426,215 | 1/1984 | Murphy | 65/4.21 |
| 4,452,506 | 6/1984 | Reeve et al. | 350/96.15 X |
| 4,557,553 | 12/1985 | McLandrich | 350/96.15 |
| 4,586,784 | 5/1986 | Tremblay et al. | 350/96.15 |
| 4,591,372 | 5/1986 | Bricheno et al. | 65/4.2 |
| 4,612,028 | 9/1986 | Abebe et al. | 65/4.2 |
| 4,618,212 | 10/1986 | Ludington et al. | 350/96.15 X |
| 4,632,513 | 12/1986 | Stowe et al. | 350/320 |
| 4,664,732 | 5/1987 | Campbell et al. | 350/96.15 X |
| 4,695,306 | 9/1987 | Hakoun et al. | 65/4.2 X |

OTHER PUBLICATIONS

Sweeney et al—"Wavelength Dependence of Devices Fabricated in Single Mode Fiber"—SPIE, vol. 630, London, Eng.—pp. 141-147, 29 Apr.-May 1, 1986.
Tekippe et al—"Single-Mode Directional Couplers'-'—reprint from Laser Focus-U.S.A., pp. 1–6—May, 1985.
Bures et al—"Analysis of a Fused Biconical Single-Mode Fiber-Optic Coupler", pp. 1918-1922—Applied Optics-U.S.A.—Jun. 15, 1983.
Tekippe—"Fused Wavelength Division Multiplexers/-Demultiplexers"—Gould, Inc., Fiber Optics Operation-U.S.A.—date unknown.

Primary Examiner—Joseph Ruggiero
Attorney, Agent, or Firm—Ervin F. Johnston; Thomas Glenn Keough

[57] ABSTRACT

An apparatus and method of manufacturing optical couplers of at least two optical fibers make explicit use of computer control to assure automation and reproducibility. The method and apparatus are independent of human operation for the precise and timely control of the coupler fabrication procedure which is necessary for reliable and high yield production. The steps of the method performed by the apparatus call for the exact starting and stopping of the movement of motor driven translation stages at an exact translation speed after at least two juxtaposed optical fibers have had a heating source positioned and toggled at an exact rate relative to the fibers in order to control the temperatures of the fibers. A computer controls the timed removal of the heat source which had raised the temperatures of at least portions of the fibers to the fusion temperature and the timed termination of the fiber elongation translation stages which draw the fibers in the proper proximity for coupling. These and other functions are all controlled independently of an operator by a computer which has been preprogrammed and which has been interfaced to optical power monitoring detectors at outputs of the individual fibers and to a control unit which appropriately actuates the motorized translation stages connected to the heat source and the fibers. The coupling characteristics of the fibers can be specifically adjusted by appropriately monitoring the power outputs of the optical fibers so that the heating and elongation of the fibers are controlled to achieve the desired results.

36 Claims, 5 Drawing Sheets $L = L_1 + L_2$ $\sin^2 (Cl) = P_c$ $\Delta z$ = length of heated (fused) region of fibers $\ell$ = coupling length $L$ = extension of fibers (translation distance of clamps)

$\ell$ is related to $\Delta z$ and $L$, but not the simple sum $L + \Delta z$ since part of the tapering of the fibers will not be part of the coupling length

AUTOMATED AND COMPUTER CONTROLLED PRECISION METHOD OF FUSED ELONGATED OPTICAL FIBER COUPLER FABRICATION

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Previous methods used to fabricate fused optical fiber couplers relied upon manual techniques and equipment which were controlled by human operators. As a consequence, the coupler fabrication process was subject to errors, a lack of reproducibility, and excessive cost. These factors resulted in an inherent low production yield for couplers having an acceptable level of performance. Placing a human operator in the fabrication process, while suitable for some laboratory experiments, precluded the creation of efficient commercially marketable couplers since the labor intensive cut and try procedures were not cost effective. Furthermore, the fabrication process was more of an "art" which depended on the unique skills of a particular operator.

Typical of the state-of-the-art couplers are shown by Matt McLandrich in his U.S. Pat. Nos. 4,377,403 and 4,557,553. The first of these patents concerns a method of fabricating a fused single-mode fiber bidirectional coupler having fibers with claddings etched away that are twisted and fused together. Evanescent coupling is relied upon for information transfer. Evanescent coupling, a term well established in the art, is set forth by N. S. Kapany and J. J. Burke in their text entitled *Optical Waveguides* Academic Press (1972). The wavelength selective coupler of the second patent permits a wavelength selective coupling of data between a pair of fibers in a bidirectional system. Both of these patents concern the end product, the couplers and do not disclose the means by which reproducible couplers are made. A reference to Barnoski et al. in U.S. Pat. No. 4,054,366 concerns a laser fused coupling of multi-mode fibers that has its coupling dependent on a fused cladding-on-cladding interconnection. A patent to Kent A. Murphy, U.S. Pat. No. 4,426,215 concerns a method of fabrication a low loss fused biconical taper fiber optic coupler that works as a reflection and transmission star coupler. The technique disclosed calls for a twisting, pulling and pushing of fibers. No computer control or automation is referred to so that the construction appears to be operator intense. The low loss access coupler for multimode optical fiber systems of Bryon S. Kawasaki et al in their U.S. Pat. No. 4,291,940 relies on fusing twisted fibers to enhance mode mixing. The method of fabrication again appears to be operator intense and the reproducibility might not be as exact as needed for mass production techniques. Terry Bricheno et al's single-mode fiber directional coupler manufacturer of U.S. Pat. No. 4,591,372 traverses fibers longitudinally through a flame while stretching them between a pair of carriages going the same direction at slightly different speeds. The Bricheno et al disclosure states that there is an observation in the manufacturing process to monitor the amount of light coming through the fibers being coupled, although it does not elaborate further on how this observation is meaningfully brought into the control of the manufacturing process. The single-mode fiber coupler of U.S. Pat. No. 4,612,028 preserves polarization in the coupler and has etched twisted fibers heated while under axial tension. A desired coupling is measured by detectors located at ends of the fibers, so that the application of axial tension and heating could be halted by means unknown, presumably a human operator. The modal-insensitive biconical taper coupler of Tremblay et al in their U.S. Pat. No. 4,586,784 has a fused together tapered coupling between fibers to allow selective coupling ratios. This patent does not disclose any means of automatically making the coupler. It must be presumed to be labor instensive, absent any indication to the contrary.

From the foregoing, it is apparent that the coupling of an optical beam from one or more fibers to another fiber or fibers is well-known in the art. However, all the couplers seem to be fabricated in accordance with methods suitable for the laboratory with considerable human intervention. They are not by any inovative, reproducible technique having cost effectiveness for mass production.

Thus, a continuing need exists in the state-of-the-art for a method and apparatus for providing a precision and reproducible fabrication of optical fiber couplers using a computer to automatically control the fabrication steps and so be adaptable for commercial use.

SUMMARY OF THE INVENTION

The present invention is directed to providing an apparatus and method of precisely and automatically manufacturing an optical coupler having predetermined coupling characteristics between at least two optical fibers. The apparatus has first and second fiber clamps to engage opposite end portions of the lengths of optical fibers and hold them in at least a partially contiguously abutting relationship along a longitudinal axis. First and second translating means each are connected respectively to a fiber clamp to translate the ends of the lengths of optical fibers in opposite directions in response to translating motor drive control signals. A (laser) light source is disposed adjacent an end of one of the optical fibers that extends through the first fiber clamp for injecting monochromatic light into the fiber. A detector disposed adjacent each end of each of the optical fibers where they extend through the second fiber clamp detects the amount of light transmitted by each fiber to provide representative detected signals. A heat source is disposed adjacent the location of the contiguously abutting relationship of the optical fibers for fusing them at least partially together to effect an optical coupling as the heat source is laterally and longitudinally displaced in response to displacing motor drive control signals. The computer coupled to receive the representative detected signals generates controller instruction signals in response to a program and parameter instructions and a motor drive controller is coupled to receive the controller instruction signals to initiate the appropriate translating motor drive control signals for translating motors to elongate the fibers and the appropriate displacing motor drive control signals for displacing motors to control the fiber's temperature.

The method of precisely and automatically manufacturing an optical coupler having predetermined optical power coupling characteristics between at least two optical fibers calls for the positioning of the optical fibers so that at least a portion of their lengths abut in a contiguous relationship. The positioned fibers are secured at opposite end portions of the optical fibers in fiber clamps. Injecting light from a laser light source into an input end of one of the fibers and optically coupling each output end of the optical fibers to a separate detector provide a means for obtaining a representative detected signal from each fiber. Placing a displaceable heat source near at least a portion of the contiguously abutting lengths of the optical fibers occurs prior to providing controller instruction signals to a motor drive controller from a computer having a program and coupler parameter instructions for a desired optical coupling coefficient between the optical fibers. The motor drive controller causes the generating of responsive displacing motor drive control signals and translating motor drive control signals. This causes the precise displacing of the displaceable heat source laterally toward and longitudinally along, toggle fashion, the contiguously abutting lengths of optical fiber by lateral and longitudinal displacing motors coupled to receive the displacing motor drive control signals, thereby controlling the temperature of the fibers. Simultaneously, there is an exerting of an oppositely directed translating force on the contiguously abutting lengths of the optical fibers by two translating force motors each connected to a separate fiber clamp. Fusing at least a portion of the contiguously abutting lengths of the optical fibers by the displaceable heat source occurs simultaneously with the displacing and the exerting. Detecting impinging light from the fibers by the detectors which each provide a representative detected signal, indicates that optical coupling is occurring. Comparing the representative detected signals in the computer provides an indication of an actual coupling coefficient value derived from the representative detected signals. Removing the displaceable heat source from the contiguously abutting lengths of the optical fibers by an appropriate controller instruction signal from the computer occurs when the actual coupling coefficient attains a predetermined value. Pulling by the oppositely directed translating force motors on the optical fibers for elongation occurs until the actual coefficient value reaches a preset desired coefficient value in the computer. Lastly, the stopping of the exerting and pulling by appropriate controller instruction signals by the computer provides a predetermined optical coupling characteristic between the optical fibers.

A prime object of the invention is to provide for an improved apparatus and method for fabricating optical couplers having a predetermined coupling characteristics such as optical power coupling ratio and wavelength selectivity.

Another object is to provide an apparatus and method for manufacturing optical couplers having predetermined optical coupling characteristics that are automatic and eliminates operator interface.

Yet another object is to provide for an apparatus for and method of fabricating optical couplers having predetermined optical coupling characteristics which are precise to lend themselves to exacting production requirements.

Another object of the invention is to provide an apparatus and method for manufacturing an optical coupler having predetermined optical coupling characteristics between at least two optical fibers that is reproducible thereby lending themselves to automated manufacturing procedures.

Still yet a further object of the invention is to provide for an apparatus and method for manufacturing an optical coupler having predetermined optical coupling characteristics that use a computer to interpret the desired optical properties, to monitor the optical properties during fabrication, and to implement the necessary fabrication steps by instructions sent to a motor drive controller for displacing and translating motors.

Yet still a further object of the invention is to provide for an apparatus and method for fabricating optical couplers with predetermined coupling ratios that employ a unique elongated torch tip design with precision toggling of the torch tip to achieve a smooth and gradual elongation of fused fibers with no deformaties.

A further object of the invention is to provide for an apparatus for and method of manufacturing optical couplers having predetermined coupling characteristics that include a method of reducing the effective heating source temperature by gradually removing the heating source from the fused region in a direction perpendicular to the axis of the fibers.

Yet still a further object is to provide for an apparatus for and method of assuring precise optical couplers having predetermined coupling ratios by continuing the elongation of fused fibers for an exact time after the heating source has been removed from the location where contiguously abutting lengths of the optical fibers have been fused.

These and other objects of the invention will become more readily apparent from the ensuing specification and drawings when taken in conjunction with the appended claims.

DESCRIPTION OF THE PREFERRED EMBODIMENTS

Figure 1:
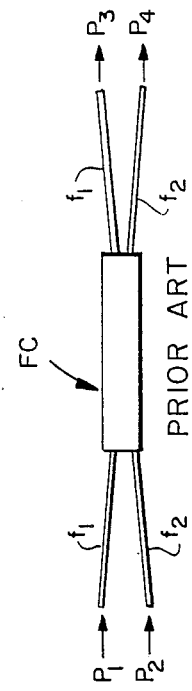
FIG. 1 is a schematic representation of a typical optical coupler.

Referring now to FIG. 1 of the drawings a representation of a fiber optic coupler FC shows a pair of fibers $f_1$ and $f_2$ fused together. Fiber couplers of this type have been fabricated by human operator intensive means. The Figure shows a pair of the fibers $f_1$ and $f_2$ although more fibers optionally could be added if a multifiber type coupler is needed. The fibers are brought close together and properly fused so that varying amounts of light are transmitted in the fibers leading from the coupler.

Typically, the term coupled power ratio is applied to identify what amount of optical power is split among fibers emerging from the coupler. When a power input $P_1$ has a normalized value of one and an input power $P_2$ equal to zero, the coupled power ratio determined from the output powers $P_3$ and $P_4$ can be expressed as:

$$\frac{P_4}{P_3 + P_4}$$

Figure 5:
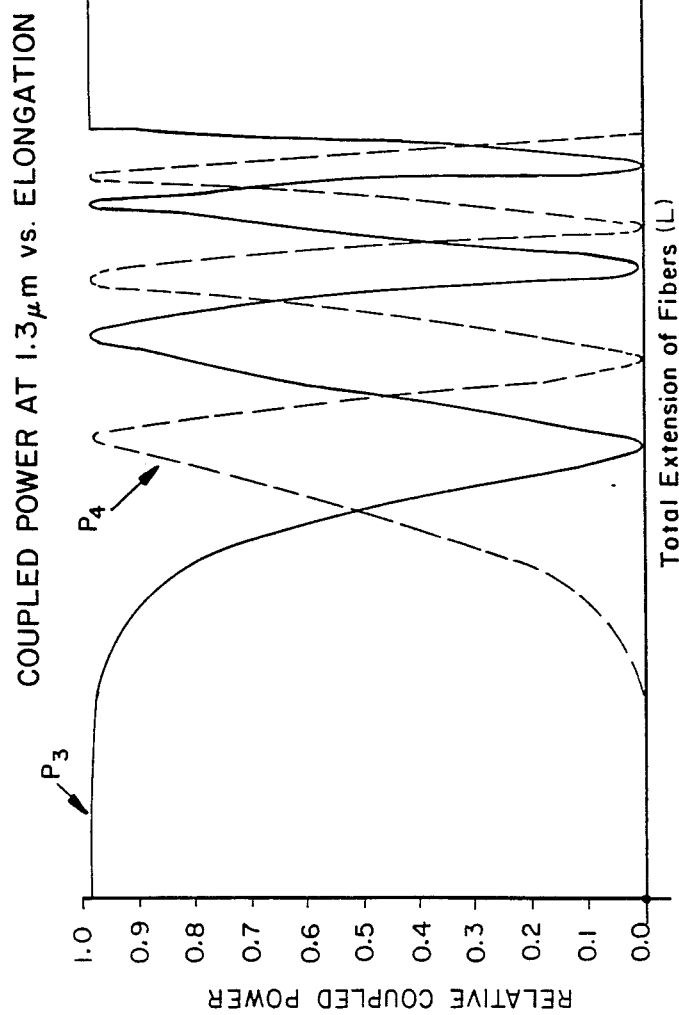
FIG. 5 is a graphical representation showing coupling power at the fiber coupler output as a function of coupler elongation.

The coupled power ratio can be designed into a coupler and is expressed as:

$$P_c = \sin^2(Cl)$$

where C is the coupling coefficient between two particular fibers and l is the coupling length, see FIG. 5.

Figure 2:
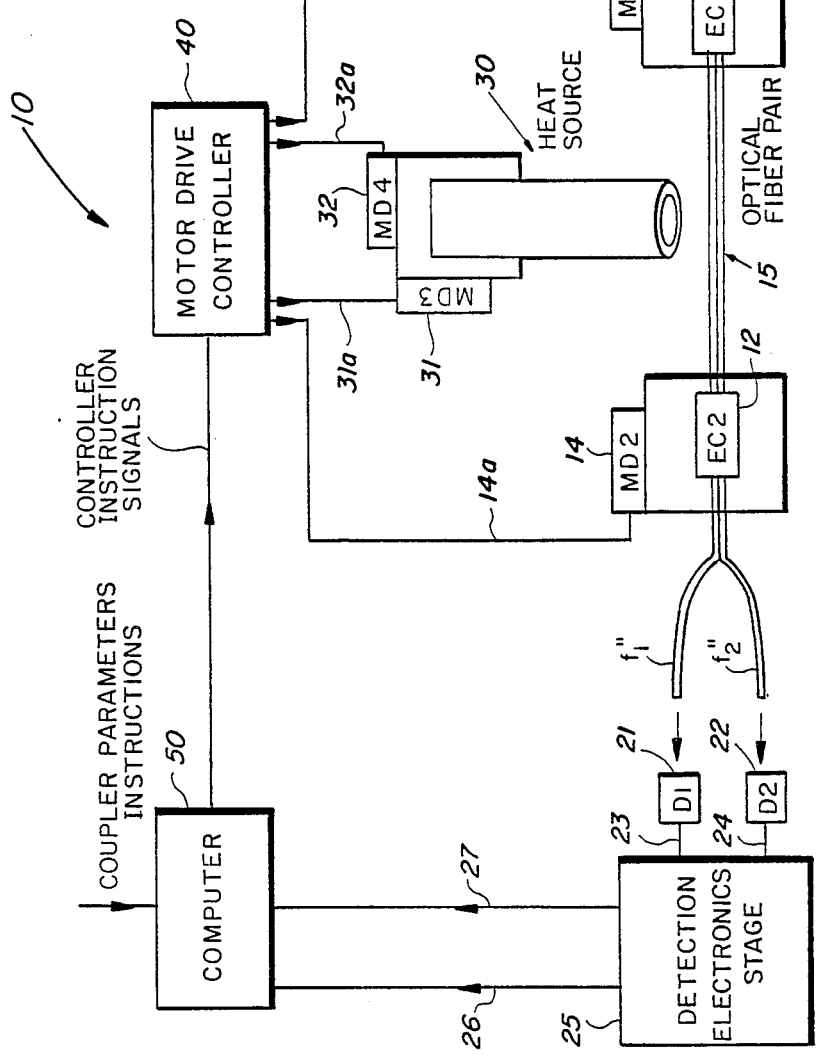
FIG. 2 is a block diagram of the apparatus of the invention for fabricating an optical coupler having a predetermined coupling ratio between at least two optical fibers.

Referring now to FIG. 2 of the drawings, an apparatus 10 is set forth for automatically manufacturing fused elongated optical fiber couplers with precision. A pair of optical fibers $f_1'$ and $f_2'$ are held between a first and a second fiber optic clamp 11 and 12. The clamps are secured to end portions of fibers $f_1'$ and $f_2'$ to hold a length 15 of the optical fibers in a contiguous abutting relationship. Optionally, the fibers can be twisted together throughout length 15 to help assure the contiguous abutting relationship.

A pair of longitudinal displacing motors 13 and 14 are coupled operatively to fiber clamps 11 and 12 respectively to effect an opposite displacement of the clamps in a direction which is substantially the same as the longitudinal axis of the length 15 of fibers $f_1'$ and $f_2'$. In one embodiment of the invention displacing motors marketed by the Newport Research Corporation of Fountain Valley, Calif. under the designation Actuators model #850 have proven to be acceptable. These motors receive DC signals and through appropriate coupling translat rotory motion into a uniform linear extension which are found to be suitable for the opposite or bidirectional excursions of the fiber clamps.

A laser diode 20 injects light into one of the fibers, fiber $f_1'$ at a desired wavelength. A detector 21 and 22 is located at a position to intercept light emanating from ends $f_1''$ and $f_2''$ which has been split between the fibers after the fusing and coupling operation. The detectors are any one of a wide variety of commercially available units suitable for providing a representative detected signal when light of a given intensity and wavelength impinges. The detected signals are coupled to output leads 23 and 24.

The analog detected output signals are fed to a suitable detection electronics circuit 25 which can be no more than a pair of suitably coupled digital volt meters each connected to convert the analog form of the detected signals into a digital form of the detected signals. The digital forms of signals are fed to output leads 26 and 27.

The detected light intensity signals received at detectors 21 and 22 are a function of whether or not there has been a coupling between the fibers caused by fusing and elongation of the fibers in length 15. For this purpose a heat source 30 is brought near the location of length 15 of the countiguously abutting fibers to effect their optical coupling.

The heat source can be any one of a variety of heat sources having the inherent capability of being controlled in intensity. Typically, the heat source can be a micro torch fed by oxygen and by a variety of other gaseous sources such as hydrogen, methane, propane, and the like, or a laser source, an electric arc, a resistance heater, or an induction heater, to name a few.

The heat source is brought near the location of the contiguously abutting length 15 by a pair of translating motors 31 and 32. The model 850 Actuators manufactured by Newport Research Corporation of Fountain Valley, Calif. have proven suitable for appropriate displacement of the heat source. Translating motor 32 is suitably connected to heat source 30 so as to move it longitudinally along length 15 of the contiguously abutting fibers. Translating motor 31 is suitably coupled to laterally displace the heat source in a direction that is substantially perpendicular to the length of the contiguously abutting fibers. While FIG. 2, at first, may lead one to believe that the translating motor 31 may only displace the heat source in the direction which is the same horizontal plane as the fibers, it is to be understood that translating motor 31 can be so oriented to displace the heat source in a direction which is vertical with the plane of the paper as well as a combination of horizontal and vertical displacement. All of these motions which can be considered as being lateral or radial from the longitudinal axis of length 15 of the contiguously abutting fibers. Therefore, in the context of the appended claims, lateral displacement encompasses a displacement which is laterally horizontal, laterally vertical or a combination thereof.

Displacing motors 13 and 14 and translating motors 31 and 32 are actuated to impart responsive motion to their interconnected elements by appropriate displacing motor drive control signals and translating motor drive control signals coupled by leads 13a, 14a and 31a and 32a respectively. These control signals are appropriate DC control signals for the identified Actuators and are created by a motor drive controller 40. The motor drive controller 40 selected in one embodiment of this inventive concept is a model #855c programmable controller marketed by Newport Research Corporation of Fountain Valley, Calif. This controller has the capability for providing appropriate DC signals to responsively drive the Actuators when it receives suitable controller instruction signals from an interconnected computer 50.

A computer selected for this application is a Hewlett-Packard 85; it is a standard desktop scientific computer which, when programmed and with the proper coupler parameter instructions and receiving the detector signals, provides controller instruction signals for appropriately controlling motor drive controller 40 to create precisely reproducible optical couplers having predetermined optical coupling characteristics.

The exact units called for herein are not to be considered as limiting for it will be readily apparent to one skilled in the art to which this invention pertains that other computers, motor drive controllers, motors, light sources and detectors can be combined in accordance with the teachings of this invention to manufacture optical couplers in a manner herein disclosed.

Figure 3:
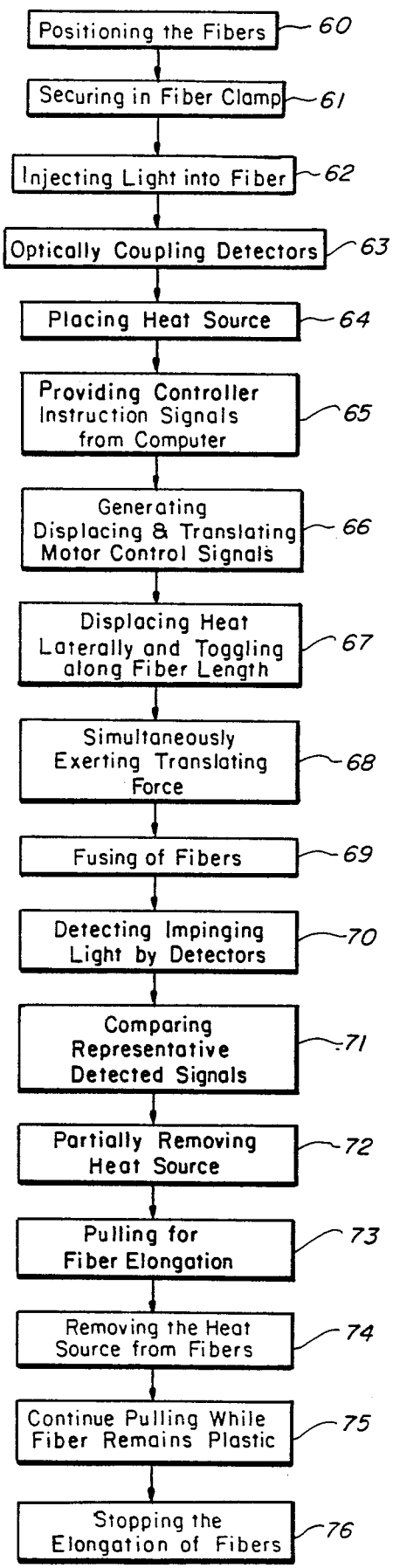
FIG. 3 sets forth a block diagram of the method of the invention for automatically manufacturing an optical coupler having a predetermined coupling ratio between at least two optical fibers.

Noting FIG. 3, fabrication of an optical coupler having a predetermined optical coupling characteristics begins with mounting a pair of fibers $f_1'$ and $f_2'$ in fiber clamps 11 and 12. The fibers can be, for example, one hundred twenty-five micron outer diameter single-mode fibers having five micron core diameters, although, this fabrication technique lends itself as well to other single mode fibers and to multimode fiber couplings. The fibers are arranged so that they have a contiguously abutting length 15 as referred above and are held in substantially a longitudinal alignment by clamps 11 and 12 with translating motors 13 and 14. Light at a well defined wavelength is injected into fiber $f_1'$ by laser diode 20 and detectors 21 and 22 are appropriately positioned to receive light of any intensity coming through ends $f_1''$ and $f_2''$, although, initially only light from $f_1''$ will be indicated at detector 21.

Heat source 30 is brought to the proper initial position for the beginning of the coupling procedure, in accordance with coupler parameter instructions fed to computer 50 and the computer's program.

The computer programmed parameter instructions in computer 50 enable the method of precisely and automatically manufacturing an optical coupler having predetermined optical coupling characteristics between at least two optical fibers. Positioning 60 the optical fibers so that at least a portion of their lengths abut in a contiguous relationship can be by maintaining them together longitudinally or twisting them longitudinally. Securing 61 opposite end portions of the optical fibers in fiber clamps 11 and 12 assures that the contiguous relationship is maintained throughout the fiber coupler fabrication process. Injecting light 62 into one of the fibers having a well defined wavelength provides a basis from which the optical coupling characteristics can be determined when there is an optical coupling 63 of detection at the fibers other ends $f_1''$ and $f_2''$. After placing 64 the displaceable heat source 30 near a portion of length 15 of the contiguously abutting lengths of the optical fiber, the programmed and coupler parameter provides controller signal instructions to effect the desired optical coupling of the fibers.

The providing 65 of the controller instruction signals from computer 50 for motor drive controller 40 is in accordance with preprogrammed and coupler parameter instructions. These preprogrammed and coupler parameter instructions contain the necessary commands to implement a predetermined desired optical coupling coefficient and coupling interaction length of the fiber held between fiber clamps 11 and 12. When different fibers are selected having different coupling coefficients and coupling interaction lengths, then the coupler parameter instructions are appropriately changed to accommodate these fibers.

The controller instruction signals coming from computer 50 are received by the motor drive controller for generating 66 displacing and translating motor control signals and feeding then over leads 31a, 32a and 13a and 14a. The appropriate displacing motor drive control signals suitably actuated displacing motors 31 and 32 to bring heat source 30 in the location of the length 15 of the fibers.

In one embodiment a microtorch has been configured that will position a torch tip which is elongated in the dimension along the direction of the longitudinal contiguous abutment of the fibers and which is narrow in the perpendicular direction. Approximate dimensions are 3 millimeters by 0.3 millimeters so that when the torch tip is longitudinally reciprocally displaced in a toggling motion, the back and forth slow motion of the torch increases the effective length of the torch tip to achieve a smooth and gradual elongation of the fiber that has no deformities.

Displacing 67, heat source 30 laterally away from and longitudinally along the contiguously abutting length 15 of the optical fibers, toggle fashion, is performed by the lateral and longitudinal displacing motors 31 and 32 when the appropriate displacing motor drive control signals are received to control the temperature of the fibers. Simultaneously exerting 68 oppositely directed translating forces on the contiguously abutting length 15 of the optical fibers is effected by the appropriate translating motor drive control signals fed to motors 13 and 14.

A fusing 69 of at least a portion of contiguously abutting length 15 of the optical fibers by displaceable heat source 30 begins simultaneously with a longitudinal displacing of the heat source and the exerting and elongating of the fibers by the force exerted by the translating motors.

A detecting 70 of the impinging light from fiber ends $f_1''$ and $f_2''$ provides representative detected signals to indicate that optical coupling is beginning and that the automated and computer controlled optical coupler fabrication procedure is progressing as expected. The analog forms of the representative detected signals are converted from analog to digital form if desired, to enable a comparing 71 of these detected signals in computer 50 so as to provide an actual coupling coefficient value derived from the representative detected signals.

Figure 4:
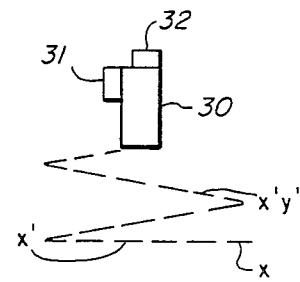
FIG. 4 schematically depicts the heat source toggling and withdrawal motion.

At this point in the process, the computer program and coupler parameter instructions for computer 50 provide suitable controller instruction signals for motor drive controller 40 to effect the partially removing 72 of heat source 30 from contiguously abutting length 15 of the optical fibers in a gradually and continuous motion by appropriate controller instruction signals from the computer. These controller instruction signals assure the generating of proper translating motor drive control signals by motor drive controller 40 to effect a gradual and continuous reduction of the temperature of the fibers to a value which is lower than the fusing temperature of the fibers but which still permits the fibers to be plastic for their elongation. Noting FIG. 4 the dashed trace x—x' depicts the pattern when the toggling or longitudinal reciprocable motion of the heat source was imparted during fusing 69 and the zig-zag trace x'y' depicts the gradual and continuous removing 72 of the heat source from the near location to the fibers in accordance with coupler parameter instructions and preprogramming of computer 50. The scale of FIG. 4 is greatly expanded. Actual increments in the perpendicular displacement from the fibers are very small compared to the length of the toggle and the number of incremental steps can be more than that shown in FIG. 4.

Figure 6:
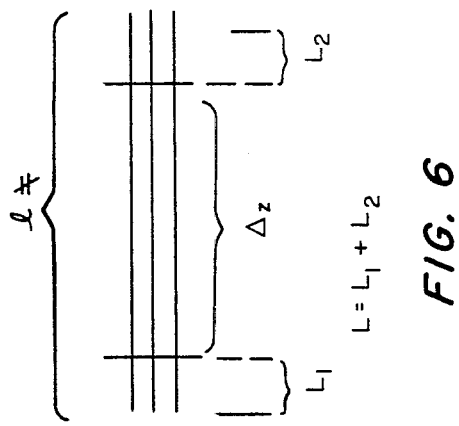
FIG. 6 demonstrates length change of the fused fibers.

Pulling 73 by the oppositely directed translating force exerted by translating force motors 13 and 14 in accordance with appropriate translating motor drive control signals from motor drive controller 40 elongates the fibers' length to encompass a total coupling length 1. The elongation due to stretching during the pulling is expressed as $L = L_1 + L_2$, see FIG. 6. When L is added to the length $\Delta z$ of the heated (fused) region of the fiber, this combined length is related to the coupling length 1. These quantities also have been provided for in the computer program and the coupler parameter instruction signals.

The pulling 73 at this stage of the process commences until the actual coefficient value (determinable from the magnitudes of the representative detected signals at detectors 21 and 22) reaches a pre-set desired coefficient value in computer 50. These magnitudes from the detectors are preestablished by the computer program and parameter instructions to correspond to locations that can be at any point along the curves of FIG. 5.

Next, a removing 74 of the displaceable heat source from the contiguously abutting lengths of the optical fibers occurs by, appropriate controller instructions signals from the computer.

A continued pulling 75 during the short time while the fibers remains plastic allows a precise realization of the desired coupling characteristics and low optical loss in the coupler. Stopping 76 the elongation of the fibers by the translating motors occurs when appropriate controller instruction signals are received from the computer. This precisely provides the predetermined optical coupling characteristics such as those shown in FIG. 5 for the 1.3 micron coupler at an elongation corresponding to three coupling cycles.

Referring to FIG. 5, the computer can be programmed selectively to terminate the elongation of the fibers after a predetermined number of complete or partial coupling cycles. This would be important in fabrication of special types of couplers such as wavelength division multiplexing couplers. For example, a wavelength division multiplexing coupler for signals with carrier wavelengths of 1.3 and 1.55 microns, can be fabricated by terminating the coupler elongation after three complete coupling cycles for light at 1.3 microns as represented in FIG. 5. From this figure it is shown that for this particular coupler design, the coupled power at 1.3 mircons (shown by the dashed line) is a minimum. A similar plot of coupled power verses elongation for light at 1.55 microns would exhibit a maximum value for this particular coupler design (that is, a particular coupler having minimum coupled power at 1.3 microns). Other couplers can be fabricated having minimum and maximum coupled power values at different wavelength values that are a function of their coupling coefficients and coupling lengths.

The computer keeps track of the coupling power ratio $$\left( \frac{P_4}{P_3 + P_4} \right)$$

plus the total elongation of the fused region. These two factors, coupled power and effective coupling length which is directly related to the length of the fused region and the extension (elongation) of the fiber largely determine the predetermined optical coupling characteristics which are regulated by computer 50.

The apparatus and method make explicit use of a computer control to provide a fully automated method of coupler fabrication which is independent of human operation. The computer control provides for precise and timely control of the fabrication procedures which is necessary for the reliable and high yield production of couplers. The steps of the method performed by the apparatus include the exact starting and stopping of the movement of the fiber elongating translating motors at an exact translating speed, the toggling of the heating source at an exact speed by the displacing motors at a specifically defined and continuously variable position relative to the fibers in order to control the temperatures of the fibers, the precise time of removing of the heat source by the displacing motors and the precise time of terminating of the fiber elongation by the translating motors. These precisely timed steps are controlled independently of an operator by a computer which has been preprogrammed and which is interfaced to optical power monitoring detectors at outputs of the fibers. Controller instruction signals are fed to a controlled unit by the computer for appropriate actuation of the translating and displacing motors.

Other processes of manufacturing couplers which are not fully automated and controlled in real time during fabrication will not yield the consistent results of the disclosed apparatus and method. The gradual, continuous, and precise removal of the heating source during elongation of the fibers is critical to reproducibility and preciseness of fiber optic coupler fabrication. Fibers having different coupling characteristics with consequent different optical coupling ratios and wavelength coupling selectability can be accommodated by a programmer who routinely will make the appropriate modifications in the computer program. One skilled in the art to which this invention pertains can routinely provide for suitable modifications of a computer program to change the relative position of the heat source relative to the fibers so that the heat source is removed at appropriate scan rates. This gradual withdrawal of the heat source reduces the temperature of the fibers during the fiber elongation procedure which has been found to be a necessary step for low loss and percise determination of the coupler optical power splitting ratio and wavelength selectivity features.

A computer program and appropriate operator entered coupler parameter instructions including the desired coupling coefficient begin the heat source displacement toward the fibers. This displacing is coupled to the simultaneous toggling of the heat source along the fibers and the translating of the fiber clamps away from each other to elongate the fibers. At a specific time the heat source is gradually removed from directly underneath or adjacent the fibers to a predetermined position to reduce the temperature of the fibers to a predetermined temperature which permits further fiber elongation by the still translating fiber clamps. The heat source continuous to toggle so as to keep the fibers plastic to enable a further elongation. When a desired coupler elongation is achieved in accordance with a program and parameter instructions and as determined by the representative detected signals provided by the detectors, the heat source is completely removed and translation of the fibers clamps continues for a short time while the fiber remains plastic, after which it stops. Appropriate computer displays and a print out of elongation length, coupling coefficient and coupler loss are thereby complied with.

To restate some of the salient features afforded by this apparatus and process a well known and readily programmable desktop computer has been advantageously employed to provide for a reproducible and precisely controllable optical coupler fabrication. The computer is routinely programmed by one skilled in the art to which this invention pertains after having the salient features of this invention in mind so as to operate the apparatus in an automated and reproducible manner. This will yield optical couplers with performance features that are preselected by the operator. The reading of representative detected signals from the photodetectors by the computer provides data concerning the properties of the coupler during fabrication, so that the computer can send the appropriate signal controller instruction signals, if needed, to the motor drive controller to initiate, modify, and terminate the various fabrication steps.

Heating and fusing the glass fibers in a central region or length and slowly pulling the fibers symmetrically along the fiber axis forms a fused and elongated region that materially contributes fabricating fused optical fiber couplers having reproducible characteristics. The desktop computer controls the fabrication steps by sending instructions to the displacing and translating motors which are based on programmed instructions and on signals received at the optical detectors and interpreted by the desktop computer.

Among several important design features for producing low loss optical couplers to have a predetermined coupling ratio or more importantly a wavelength selectivity for wavelength division multiplexing, the couplers are fabricated to assure that the elongation produced by heating is gradual, smooth, and free of deformaties. Such elongation is produced by the apparatus and method by the heat source toggled along the direction of the fibers' longitudinal axes.

Another design feature for producing couplers with predetermined optical properties, such as coupling power and wavelength selectivity, is that the effective flame temperature is reduced as the fiber cross sectional diameters are reduced during the process of elongation of the fibers. Reduction of the temperatures is accomplished by gradually pulling away the toggling heat source to a predetermined position by the displacing motors in a transverse direction from the central region of the fibers while continuing the axial pulling by the translating motors.

Still another important feature for fabrication of optical fiber couplers with predetermined optical properties including coupled power ratio and wavelength selectivity is that the heat source is removed from the elongated (taper) region at a precise moment during the fabrication process and that the fibers continue to be pulled and elongated for a short and precise period of time after the removal of the heat source.

Essential for the accurate and timely implementation of these fabrication features is a computer program to accept the predetermined coupler optical properties, to monitor and interpret the optical detected signals and to send appropriate instructions to the control unit to implement and modify the movements of the displacing and translating motors so as to achieve a coupler with the desired optical properties.

Figure 7A:
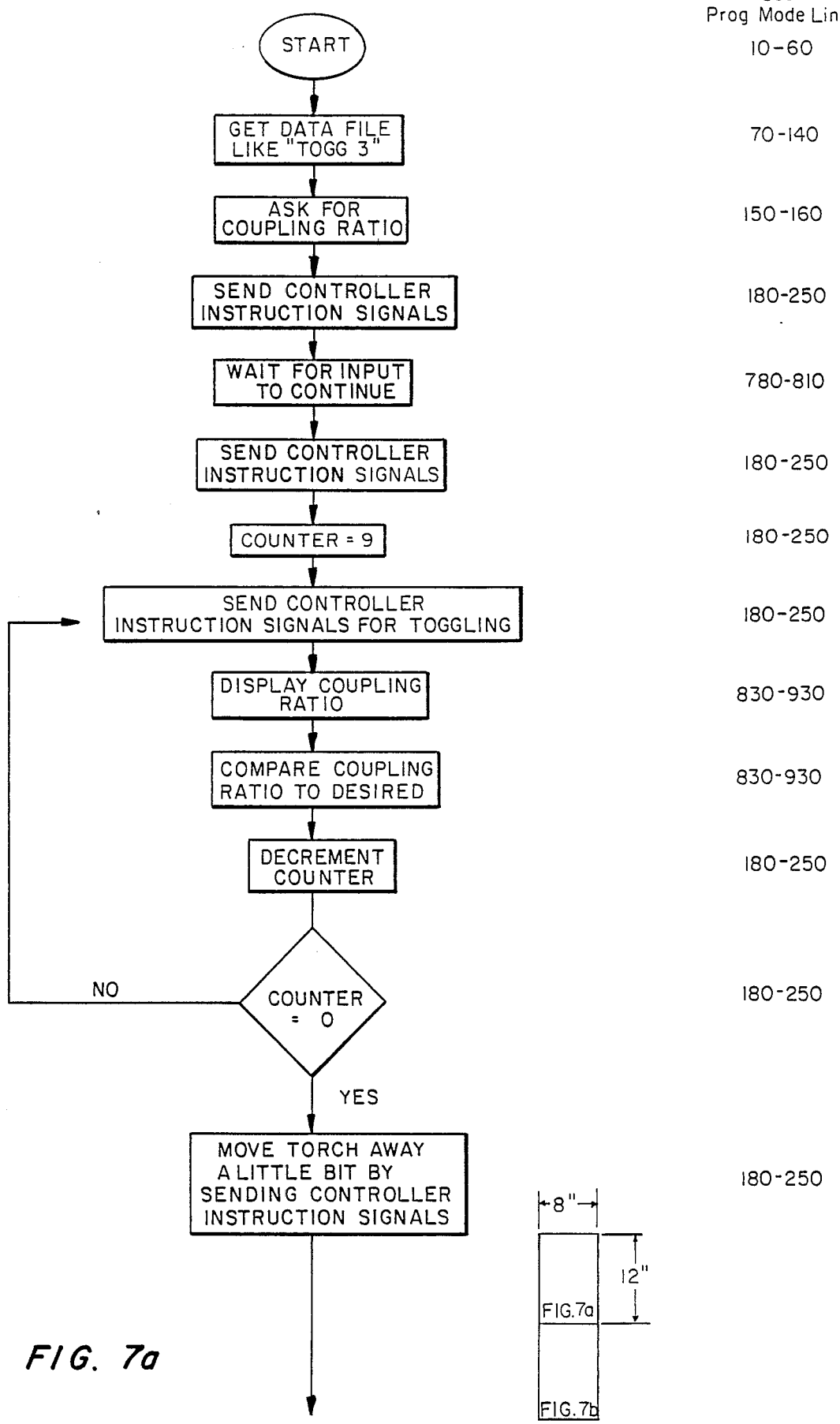
FIGS. 7a and 7b show a program flow chart of the method.
Figure 7B:
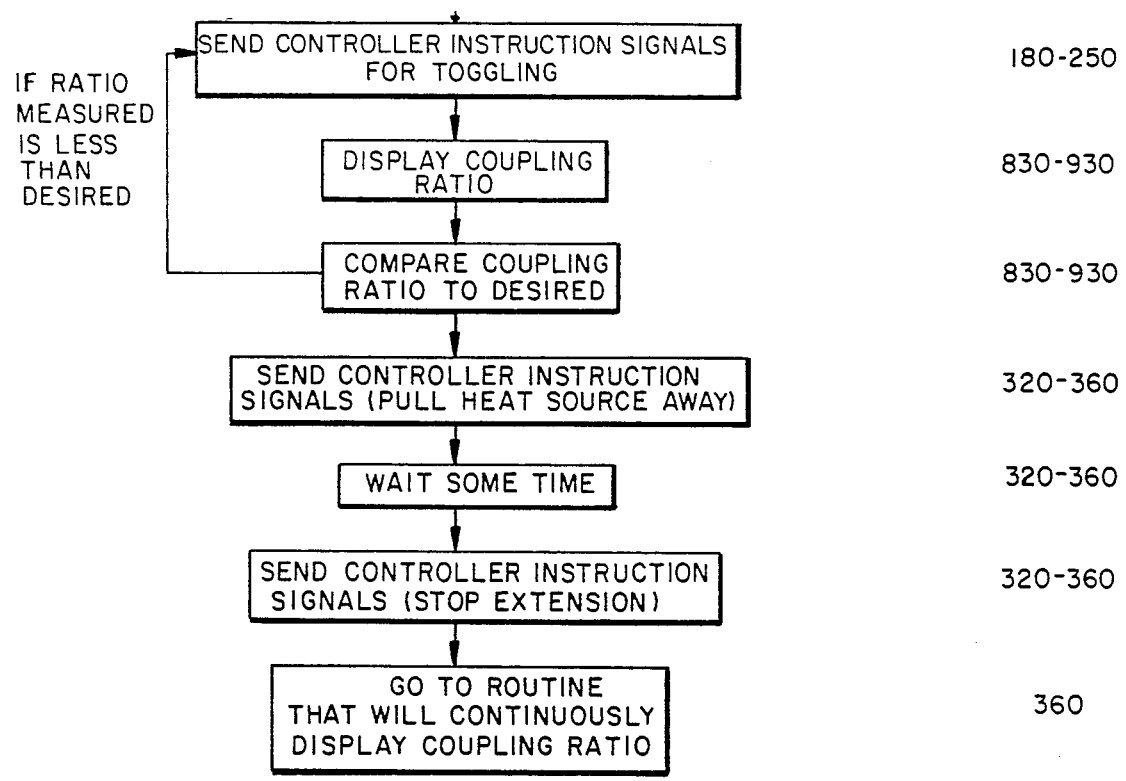

While the coupling of only two fibers has been discussed, it is apparent that more than two fibers can be coupled reproducibly in accordance with this inventive concept. An appropriate number of detectors and modifications of the computer program and coupler parameter instructions need follow as will become apparent to one skilled in this art. A program for the Hewlett Packard 85 desktop computer, Prog. Mode, and instructions, TOGG3, for motor drive controller 50 follow. FIGS. 7a and 7b show a typical flow chart for this concept.

PROG MODE

```
10 PROG MODE
20 T1=5000   COM IO
23 COM F$[15]
24 COM R
25 IMAGE D.DDD,5X, MD.DD,"dB"
30 DIM A$[15],A1$[15]
40 DIM P$[1000]
50 DIM O$[1000]
60 GOSUB 480
70 CLEAR   DISP "FILE TO GET DATA FROM";
80 INPUT A$
82 F$=A$ 1 USED ONLY FOR OUTPUT
85 GOSUB 800
90 ON ERROR GOTO 140
100 ASSIGN# 1 TO A$
110 OFF ERROR   READ# 1; O$
120 ASSIGN#1 TO *
130 GOTO 150
140 DISP "DISK ERROR OR FILE NOT FOUND"   GOSUB 810   GOTO 70
150 DISP "ENTER COUPLING COEFFICIENT";
160 INPUT R
170 GOSUB 810
180 P=0   ENTER 707 ; A$   IO=VAL(A$)
190 FOR I-1 TO (LEN(O$)-7)/8
200 IF P=1 THEN GOTO 320
210 A$=O$[I*8,I*8+7]
220 IF A$[1,1]="J" THEN GOTO 370
230 IF A$[1,1]="W" THEN ON TIMER# 1,VAL(A$[2]) GOTO 265   GOTO 830
240 GOSUB 595
250 NEXT I
260 BEEP   PAUSE
265 OFF TIMER# 1   GOTO 250
320 A$="V4.4"&CHR$(13)&"H4"&CHR$(13)&"H3"&CHR$(13)   OUTPUT 709 USING "#,K"; A$
325 OFF TIMER # 1
330 WAIT T1
340 A$="T"&CHR$(13)&"H4"&CHR$(13)&"H3"&CHR$(13)   OUTPUT 709 USING "#,K"; A$
360 DISP "STOPPED"   CHAIN "COUP COEF"
370 L1=VAL(A$[6,8])   L2=VAL(A$[2,4])
380 FOR J=1 TO L1
390 FOR Q=L2 TO 1 STEP -1
400 IF P=1 THEN GOTO 320
410 K=8*(I-Q)
420 A$=O$[K,K+7]
430 IF A$[1,1]="W" THEN ON TIMER# 1, VAL(A$[2]) GOTO 450   GOTO 830
440 GOSUB 595
```

-continued

```
450 NEXT Q
460 NEXT J
470 GOTO 250
480 S=SPOLL (709)
490 CLEAR
500 RESET 7
510 ENABLE INTR 7;8  SRQ
520 ON INTR 7 GOSUB 660
530 ON KEY# 1, "PULL OFF" GOSUB 320
540 ON KEY# 2, "TO EDIT" GOSUB 780
550 ON KEY# 3, "TO EDGE" GOSUB 820
560 REMOTE 707,708
570 OUTPUT 707,708; "G1TOR4X"
590 RETURN
595 DISP "LINE";I
597 DISP "----";A$;"----"
600 FOR K=1 TO LEN(A$)   IF A$[K,K] ""THEN GOTO 610 ELSE A$=A$[1,K-1]
    GOTO 620
610 NEXT K
620 A$=A$&CHR$(13)
630 OUTPUT 709 USING "#,K"; A$
640 IF A$[1,1]="T" THEN GOSUB 780
650 RETURN
660 STATUS 7,1; A
670 ENTER 709 USING "#%,#%K"; P$
750 S=SPOLL (709)
760 ENABLE INTR 7;8  RETURN
780 DISP "TYPE [ENDLINE] TO CONTINUE TYPE[K2] [ENDLINE] TO GO TO EDIT
    MODE"
790 INPUT A$  IF A$="" THEN RETURN
800 IF NUM(A$[1,1])=129 THEN CHAIN "EDIT MODE" ELSE RETURN
810 DISP   DISP "TYPE [ENDLINE] TO CONTINUE";   INPUT A$   RETURN
820 A1$="M4-5.8"CHR$(13)   OUTPUT 709 USING "#,K"; A1$   RETURN
830 ENTER 707 ; M1$
860 ENTER 708 ; M2$
880 M1=VAL(M1$)
900 M2=VAL(M2$)
910 M=M2/(M1+M2)
915 DISP USING 25 ; M,LGT((M1+M2)/IO)*10
920 IF M   R THEN GOTO 320
930 GOTO 830
940 DISP "INPUT EXPERIMENT NUMBER";
950 INPUT A$
960 PRINT "EXPERIMENT";A$
970 PRINT
980 DISP "INPUT 'TO EDGE' POSITION";
990 INPUT A$
1000 PRINT "TO EDGE      = 2 X";A$
1010 DISP "INPUT TOTAL EXTENSION";
1020 INPUT A$
1030 PRINT "TOTAL EXTENSION"     = 2 X";A$
1040 PRINT "COMPUTER'S COUPLING COEF.=";R
1050 PRINT "COUPLING AT PULL AWAY =";INT(M2/(M1+M2)*100+.5)/100
1060 ENTER 707 ; M1$
1070 ENTER 708 ; M2$
1080 M1=INT(VAL(M1$[5])*100+.5)/100
1090 M2=INT(VAL(M2$[5])*100+.5)/100
1100 PRINT "FINAL APPROX COUPLING =";INT(M2/(M1+M2)*100+.5)/100
1110 RETURN
```

TOGG3

FILENAME: TOGG3
LINE 1
LINE 2    VO.4
LINE 3    A1-23.
LINE 4    A2-23.
LINE 5    V1.01
LINE 6    V2.01
LINE 7    M4-6.5
LINE 8    W16250
LINE 9    V4.01
LINE 10   A4-5.8
LINE 11   T
LINE 12   M1
LINE 13   M2
LINE 14   M33.
LINE 15   W7500
LINE 16   M3-3.
LINE 17   W15000
LINE 18   M33.
LINE 19   W15000
LINE 20   J004-009
LINE 21   M3-3.

-continued

| | |
|---|---|
| LINE 22 | W15000 |
| LINE 23 | M4 |
| LINE 24 | M33. |
| LINE 25 | W15000 |
| LINE 26 | M3-3. |
| LINE 27 | W15000 |
| LINE 28 | M33. |
| LINE 29 | W15000 |
| LINE 30 | J004-090 |
| LINE 31 | V4.4 |
| LINE 32 | H4 |
| LINE 33 | H3 |
| LINE 34 | W5000 |
| LINE 35 | T |

TOGG3 sets out the controller instruction signals that are sent to motor drive controller 40 from computer 30. Signals are sent in by the program called Prog Mode. Prog Mode takes the coupled parameter instructions, e.g. a desired optical coupling ratio, and the representative detected signals from detectors 20 and 21 to arrive at the timing of the TOGG3 controller instruction signals. The TOGG3 instructions can be modified as required by different fibers and coupling characteristics. In this case TOGG3 designates the instructions associated with fibers and coupling characteristics employing a plus and minus 3 m toggled motion of heat source 30.

Obviously, many modifications and variations of the present invention are possible in the light of the above teachings. It is therefore to be understood that within the scope of the appended claims the invention may be practiced otherwise that as specifically described.

I claim:

1. An apparatus for optically coupling lengths of at least two optical fibers held together in at least a partially contiguously abutting relationship along a longitudinal axis by translating motors at opposite ends that pull in opposite directions in response to translating motor drive control signals, the fibers being near a heat source that fuses the fibers at least partially together to help effect an optical coupling therebetween, when displacing motors laterally and longitudinally displace the heat source in response to displacing motor drive control signals and detectors each adjacent an end of each length of the optical fibers sense the amount of light received from a light source coupled to one fiber to provide representative detected signals, to create predetermined optical coupling characteristics comprising:

means coupled to receive each representative detected signal from all the detectors for generating appropriate translating motor drive control signals for the translating motors and for generating appropriate displacing motor drive control signals for the laterally and longitudinally displacing motors in response to the representative detected signals and in accordance with a computer program and parameter instruction signals so as to reproducibly create said predetermined optical coupling characteristics in the optical coupling.

2. An apparatus according to claim 1 in which the appropriate generating means includes a computer coupled to receive, process and analyze the representative detected signals to generate controller instruction signals in response to the computer program and parameter instructions for a motor drive controller coupled to receive the controller instruction signals to initiate the appropriate translating motor drive control signals and the displacing motor drive control signals for first and second translating motors and the laterally and longitudinally displacing motors.

3. An apparatus according to claim 2 in which each detector is coupled to detection electronics that provides a digital form of the representative detected signals and the computer is a digital computer coupled to receive the digital form of the representative detected signals.

4. An apparatus according to claim 3 in which fiber clamps hold the fibers and the first and second translating motors translate the fiber clamps in opposite directions and stop translational motion of the fiber clamps precisely when the motor drive controller provides the proper translating motor drive control signals during the time when the heat source makes the optical fibers plastic and after the heat source is laterally withdrawn, to assure that said predetermined optical coupling characteristics in the optical coupling are created.

5. An apparatus according to claim 4 in which the laterally and longitudinally displacing motors are responsive to displacing motor drive control signals to respectively laterally displace the heat source toward the location of the contiguously abutting relationship of lengths of the optical fibers and withdraw the heat source means therefrom and to reciprocally displace in a toggle motion the heat source longitudinally along the location of the contiguously abutting relationship of the optical fibers to effect the fusing and making plastic of the optical fibers for permitting the longitudinal elongation thereof to help assure said predetermined optical coupling characteristics in the optical coupling.

6. An apparatus according to claim 5 in which the computer is programmed to gradually partially withdraw the fusing means from the optical fibers while continuing the toggle motion of the heat source to thereby gradually and continuously reduce the temperature of the fibers to a value that is lower than the fusing temperature but still allows elongation of the fibers.

7. An apparatus according to claim 6 in which the program and the parameter instructions of the computer initiate the withdrawal of the heat source by appropriate displacing motor drive control signals and continue passing appropriate translating motor drive control signals to the first and second translating motors when the representing detector signals indicate a predetermined optical power coupling ratio to continue elongating the plastic optical fibers until said predetermined optical coupling characteristics are achieved.

8. An apparatus according to claim 7 in which the heat source is a micro torch.

9. An apparatus according to claim 7 in which the heat source is a laser.

10. An apparatus according to claim 7 in which the heat source is an electric arc.

11. An apparatus according to claim 7 in which the heat source is a resistance heater.

12. An apparatus according to claim 7 in which the heat source is an induction heater.

13. A method of precisely and automatically manufacturing an optical coupler having predetermined optical coupling characteristics between at least two optical fibers held so that at least a portion of their lengths abut in a contiguous relationship with light injected in one of the fibers and detected at the other ends of the fibers to provide representative detected signals in response to the fusing thereof by a displaceable heat source comprising:

providing controller instruction signals for a motor drive controller from a computer having a program and coupler parameter instructions to create a desired optical coupling coefficient and coupling interaction length of the optical fibers;

generating responsive displacing motor drive control signals and translating motor drive control signals from the controller instruction signals sent to the motor drive controller from the computer;

displacing the displaceable heat source laterally toward and longitudinally along the contiguously abutting lengths of the optical fiber, toggle fashion, by lateral and longitudinal drive motors coupled to receive the displacing motor drive control signals thereby controlling the temperature of the fibers;

simultaneously exerting an oppositely directed translating force on the contiguously abutting lengths of the optical fibers by two translating force motors receiving appropriate translating motor drive control signals each connected to a separate fiber clamp and receiving the translating motor drive control signals;

fusing at least a portion of the contiguously abutting lengths of the optical fibers by the displaceable heat source simultaneously with the longitudinal displacing of the heat source and the exerting and the elongating of the fibers by the translating force motors;

detecting impinging light from the fibers by detectors which each provide a representative detected signal to indicate that optical coupling is occurring;

comparing the representative detected signals in the computer to provide an actual coupling coefficient value derived from the representative detected signals;

partially removing the displaceable heat source from the contiguously abutting lengths of the optical fibers in a gradual and continuous motion by appropriate controller instruction signals from the computer which assure the generating of proper translating motor drive control signals to thereby gradually and continuously reduce the temperature of the fibers to a value that is lower than the fusing temperature but still allows elongation of the fibers;

pulling by the oppositely directed translating force motors on the optical fibers for fiber length elongation by appropriate controlled instruction signals by the computer until the actual coefficient value reaches a preset desired coefficient value in the computer;

complete removing the displaceable heat source from the contiguously abutting lengths of the optical fibers by appropriate controller instruction signals from the computer;

continue pulling by the translating force motors on the fibers to allow a precise realization of the desired coupling characteristics and low optical loss in the coupler;

stopping the elongation of the fibers by translating force motors by receiving appropriate controller instruction signals from the computer to provide the predetermined optical coupling characteristics.

14. A method according to claim 13 in which the exerting and pulling by the translating force motors on the optical fibers creates an exact translating speed by the fiber clamps to produce a smooth elongation and diameter reduction of the optical fibers at a rate predetermined by the controller instruction signals from the computer to assure the predetermined optical coupling characteristics.

15. A method according to claim 14 in which the partial removing of the displaceable heat source is at an exact rate to reduce the heating temperature as the optical fibers are being elongated by the translating force motors in accordance with the controller instruction signals from the computer to assure the predetermined optical coupling characteristics.

16. A method according to claim 15 in which the complete removing of the displaceable heat source be at a precise time while the fibers are being elongated and that the stopping of the elongation of the fibers be after a precise duration after the complete removing of the displaceable heat source, both the removing and the stopping times being in accordance with the controller instruction signals from the computer to assure the predetermined optical coupling characteristics.

17. A method according to claim 16 in which the controller instruction signals of the computer are preprogrammed therein to accept values representative of predetermined actual and desired coupler characteristics as determined by the interrelated parameters, coupling coefficients, coupling length, coupled power ratio and number of coupling cycles to compare the values of the representative detector signals and to initiate the motor drive controller to move the interconnected motors appropriately.

18. An apparatus for optically coupling lengths of at least two optical fibers together with predetermined optical power coupling characteristics comprising:

first and second means engaging opposite end portions of the lengths of the optical fibers where they extend therethrough for holding them in at least a partially contiguously abutting relationship along a longitudinal axis;

first and second means each connected to a first and second holding means respectively for translating the ends of the lengths of optical fibers in opposite directions in response to translating motor drive control signals;

means disposed adjacent the locations of the lengths of the contiguously abutting relationship of the optical fibers for fusing them at least partially together to effect an optical coupling therebetween;

means mounting the fusing means for laterally and longitudinally displacing the fusing means in response to displacing motor drive control signals;

means disposed adjacent an end of one of the optical fibers that extends through the first holding means for injecting light therein;

means disposed adjacent an end of each length of optical fiber that has extended through the second holding means for detecting the amount of light received thereby to provide a representative detected signal;

means coupled to receive each representative detected signal from all the detecting means for generating appropriate translating motor drive control signals for the first and second translating means and for generating appropriate displacing motor drive control signals for the laterally and longitudinally displacing means in response to the representative detected signals and in accordance with a computer program and parameter instructions so as to reproducibly create said predetermined optical coupling characteristics in the optical coupling.

19. An apparatus according to claim 18 in which the appropriate generating means includes a computer coupled to receive, process and analyze the representative detected signals to generate controller instruction signals in response to the computer program and parameter instructions for a motor drive controller coupled to receive the controller instruction signals to initiate the appropriate translating motor drive control signals and the displacing motor drive control signals to the first and second translating means and the laterally and longitudinally displacing means.

20. An apparatus according to claim 21 in which each detecting means is coupled to detection electronics that provides a digital form of the representative detected signals and the computer is a digital computer coupled to receive the digital form of the representative detected signals.

21. An apparatus according to claim 22 in which the first and second holding means are fiber clamps and the first and second translating means are motors responsive to translate the fiber clamps in opposite directions and to stop translational motion of the fiber clamps precisely when the motor drive controller provides the proper translating motor drive control signals during the time when the fusing means makes the optical fibers plastic and after the fusing means is laterally withdrawn, to assure that said predetermined optical coupling characteristics in the optical coupling are created.

22. An apparatus according to claim 21 in which the laterally and longitudinally displacing means is a pair of motors responsive to displacing motor drive control signals to respectively laterally displace the fusing means toward the location of the contiguously abutting relationship of lengths of the optical fibers and withdraw the fusing means therefrom and to reciprocally displace in a toggle motion, the fusing means longitudinally along the location of the contiguously abutting relationship of the optical fibers to effect the fusing and making plastic of the optical fibers for permitting the longitudinal elongation thereof to help assure said predetermined optical coupling characteristics in the optical coupling.

23. An apparatus according to claim 22 in which the computer is programmed to gradually partially withdraw the fusing means from the optical fibers while continuing the toggle motion of the fusing means to thereby gradually and continuously reduce the temperature of the fibers to a value that is lower than the fusing temperature but still allows elongation of the fibers.

24. An apparatus according to claim 23 in which the program and parameter instructions of the computer initiate the withdrawal of the fusing means by appropriate displacing motor drive control signals and continue passing appropriate translating motor drive control signals to the motors of the first and second translating means when the representative detector signals indicate a predetermined optical power coupling ratio to continue of the plastic optical fibers until the predetermined optical coupling characteristics are determined.

25. An apparatus according to claim 24 in which the fusing means is a micro torch.

26. An apparatus according to claim 24 in which the fusing means is a laser.

27. An apparatus according to claim 24 in which the fusing means is an electric arc.

28. An apparatus according to claim 24 in which the fusing means is a resistance heater.

29. An apparatus according to claim 24 in which the fusing means is an induction heater.

30. A method of precisely and automatically manufacturing an optical coupler having predetermined optical coupling characteristics between at least two optical fibers each having an input end and an output end comprising:

positioning the optical fibers so that at least a portion of their lengths abut in a contiguous relationship;

securing opposite end portions of the optical fibers in a separate fiber clamp;

injecting light from a light source into an input end of one of the fibers;

optically coupling each output end of the optical fibers to a separate detector each having the capability to provide a representative detected signal from impinging light;

placing a displaceable heat source near at least a portion of the contiguously abutting lengths of the optical fibers;

providing controller instruction signals for a motor drive controller from a computer having a program and coupler parameter instructions to create a desired optical coupling coefficient and coupling interaction length of the optical fibers;

generating responsive displacing motor drive control signals and translating motor drive control signals from the controller instruction signals sent to the motor drive controller from the computer;

displacing the displaceable heat source laterally toward and longitudinally along the contiguously abutting lengths of the optical fiber, toggle fashion, by lateral and longitudinal drive motors coupled to receive the displacing motor drive control signals thereby controlling the temperature of the fibers;

simultaneously exerting an oppositely directed translating force on the contiguously abutting lengths of the optical fibers by two translating force motors receiving appropriate translating motor drive control signals each connected to a separate fiber clamp and receiving the translating motor drive control signals;

fusing at least a portion of the contiguously abutting lengths of the optical fibers by the displaceable heat source simultaneously with the longitudinal displacing of the heat source and the exerting of the translating forced on the fibers by the translating motors;

detecting impinging light coming through the fibers by detectors which each provide a representative detected signal to indicate that optical coupling is occurring;

comparing the representative detected signals in the computer to provide an actual coupling coefficient value derived from the representative detected signals;

partially removing the displaceable heat source from the contiguously abutting lengths of the optical fibers in a gradual and continuous motion by appropriate controller instruction signals from the computer which assures the generating of the proper displacing motor drive control signals to thereby gradually and continuously reduce the temperature of the fibers to a value that is lower than the fusing temperature but still allows elongation of the fibers;

pulling by the oppositely directed translating force motors on the optical fibers for fiber length elongation by appropriate controller instructions by the computer until the actual coefficient value reaches a preset desired coefficient value in the computer;

completely removing the displaceable heat source from the contiguously abutting lengths of the optical fibers by appropriate controller instruction signals from the computer;

continue pulling by the translating motors on the fibers to allow a precise realization of the desired coupling characteristics and low loss in the coupler;

stopping the elongation of the fibers by the translation force motors receiving appropriate controller instruction signals by the computer to provide the predetermined optical coupling characteristics.

31. A method according to claim 30 in which the exerting and pulling by the translating force motors on the optical fibers creates an exact translating speed by the fiber clamps to produce a smooth elongation and diameter reduction of the optical fibers at a rate predetermined by the controller instruction signals from the computer to assure the predetermined optical coupling characteristics.

32. A method according to claim 31 in which the partial removing of the displaceable heat source is at an exact rate to reduce the heating temperature as the optical fibers are being elongated as the fiber clamps are being displaced by the translating force motors in accordance with the controller instruction signals from the computer to assure the predetermined optical coupling characteristics.

33. A method according to claim 32 in which the complete removing of the displaceable heat source be at a precise time while the fibers are being elongated and that the stopping of the elongation of the fibers be after a precise duration after the complete removing of the displaceable heat source, both the removing and the stopping times being in accordance with the controller instruction signals from the computer to assure the predetermined optical coupling characteristics.

34. A method according to claim 33 in which the controller instruction signals of the computer are preprogrammed therein to accept values representative of predetermined actual and desired coupler characteristics as determined by the interrelated parameters, coupling coefficients, coupling length, coupled power ratio and number of coupling cycles to compare the values of the representative detector signals and to initiate the motor drive controller to move the interconnected motors appropriately.

35. A method of fabricating an optical coupler having predetermined optical coupling characteristics between at least two optical fibers held in a contiguously abutting relationship;

providing controller instruction signals from a computer responsive to a program, to coupler parameter instructions and to representative detected signals;

displacing a heat source in accordance with the controller instruction signals for lateral and longitudinal motion relative to the contiguously abutting fibers;

exerting a tensile force on the contiguously abutting fibers substantially aligned with their longitudinal axis in accordance with the controller instruction signals;

fusing the contiguously abutting fibers by the heat source in accordance with the controller instruction signals, at least portions of the displacing, exerting and fusing occurring simultaneously;

withdrawing the heat source to a position that maintains the optical fibers plastic in accordance with the controller instruction signals;

pulling the contiguously abutting fibers by the tensile force to effect their selective elongation in accordance with the controller instruction signals;

withdrawing completely the heat source;

continue pulling for short time while fibers remain plastic; and stopping the pulling when the predetermined optical coupling characteristics are reached.

36. A method according to claim 35 in which all the withdrawing, pulling and stopping are at precise times and rates in accordance with the controller instructions to assure the predetermined optical coupling characteristics.

* * * * *